United States Patent
Vang

(10) Patent No.: US 9,930,474 B2
(45) Date of Patent: Mar. 27, 2018

(54) METHOD AND SYSTEM FOR INTEGRATING WEARABLE GLASSES TO VEHICLE

(71) Applicants: DENSO International America, Inc., Southfield, MI (US); DENSO CORPORATION, Kariya-shi, Aichi-ken (JP)

(72) Inventor: Doua Vang, Waterford, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 289 days.

(21) Appl. No.: 14/581,574

(22) Filed: Dec. 23, 2014

(65) Prior Publication Data

US 2016/0014548 A1     Jan. 14, 2016

Related U.S. Application Data

(60) Provisional application No. 62/021,853, filed on Jul. 8, 2014.

(51) Int. Cl.
*H04W 4/00* (2009.01)
*H04L 29/08* (2006.01)

(52) U.S. Cl.
CPC .............. *H04W 4/008* (2013.01); *H04L 67/12* (2013.01)

(58) Field of Classification Search
USPC ...................................................... 455/41.2
See application file for complete search history.

(56) References Cited

U.S. PATENT DOCUMENTS

| | | | |
|---|---|---|---|
| 2013/0004402 A1 | 1/2013 | Smith et al. | |
| 2014/0022163 A1 | 1/2014 | Olsson et al. | |
| 2014/0098008 A1* | 4/2014 | Hatton | G06T 11/00 345/8 |
| 2015/0192426 A1* | 7/2015 | Foster | G01C 21/3629 715/765 |
| 2015/0234186 A1* | 8/2015 | Meadows | G02B 27/017 345/8 |

* cited by examiner

*Primary Examiner* — Ankur Jain
*Assistant Examiner* — Zhitong Chen
(74) *Attorney, Agent, or Firm* — Harness, Dickey & Pierce, P.L.C.

(57) ABSTRACT

A system for integrating a wearable personal electronic device with a vehicle. The system includes an interface, a vehicle camera, and a vehicle heads-up display. The interface is configured to connect the wearable personal electronic device to the system. The vehicle camera is configured to provide video input to the wearable personal electronic device through the interface. The vehicle heads-up display is configured to display data received from the wearable personal electronic device.

14 Claims, 4 Drawing Sheets

METHOD AND SYSTEM FOR INTEGRATING WEARABLE GLASSES TO VEHICLE

CROSS-REFERENCE TO RELATED APPLICATION

This application claims the benefit of U.S. Provisional Application No. 62/021,853, filed on Jul. 8, 2014, the entire disclosure of which is incorporated herein by reference.

FIELD

The present disclosure relates to methods, systems, and devices for integrating wearable glasses to vehicles.

BACKGROUND

This section provides background information related to the present disclosure, and is not necessarily prior art.

Wearable electronic devices, such as glasses (e.g., Google Glass™) and watches, for example, are becoming increasingly popular. Although such devices can be useful while operating a vehicle, their use may be prohibited by various regulations. Methods, systems, and devices that provide for safe use of such wearable devices in a manner that complies with any relevant regulations would therefore be desirable.

SUMMARY

The present teachings provide for a system for integrating a wearable personal electronic device with a vehicle. The system includes an interface, a vehicle camera, and a vehicle heads-up display. The interface is configured to connect the wearable personal electronic device to the system. The vehicle camera is configured to provide video input to the wearable personal electronic device through the interface. The vehicle heads-up display is configured to display data received from the wearable personal electronic device.

The present teachings further provide for a method for integrating a wearable personal electronic device with a vehicle system. The method includes the following: connecting the wearable personal electronic device to the vehicle system through an interface of the vehicle system; inputting data to the personal electronic device from a camera of the vehicle system configured to capture at least one of image data or non-image data; and displaying data from the personal electronic device on a heads-up display of the vehicle system.

The present teachings also provide for a system for integrating electronic glasses with a vehicle. The system includes a dock, a first vehicle camera, a vehicle heads-up display, and a controller. The dock is within a passenger cabin of the vehicle including an electronic interface configured to charge the glasses and electronically connect the glasses to the system. The first vehicle camera is mounted to the vehicle and configured to capture at least one of image data or non-image data external to the vehicle. The first vehicle camera is in communication with the glasses to provide video input to the glasses. The vehicle heads-up display is configured to receive data inputs from the glasses. The controller is configured to prioritize input commands to the glasses based in part on user preferences and learned behavior.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
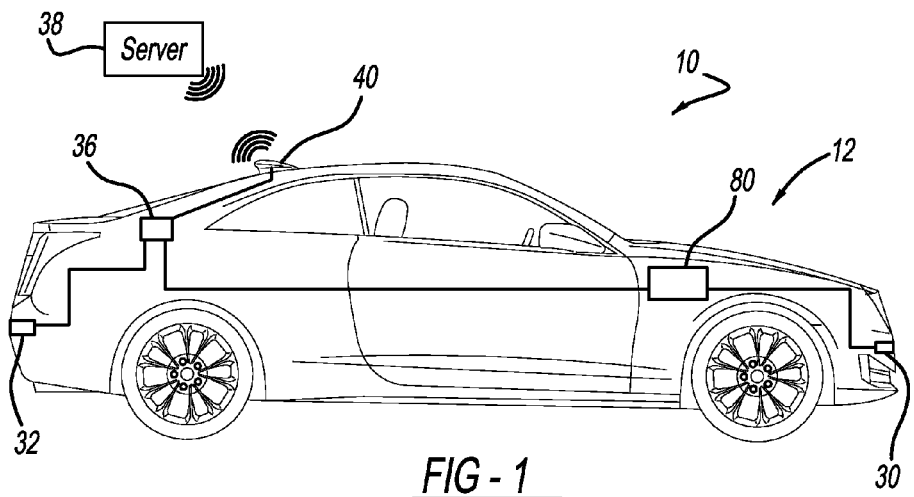
FIG. 1 illustrates a vehicle including a system according to the present teachings for integrating a wearable personal electronic device with the vehicle.
Figure 2A:
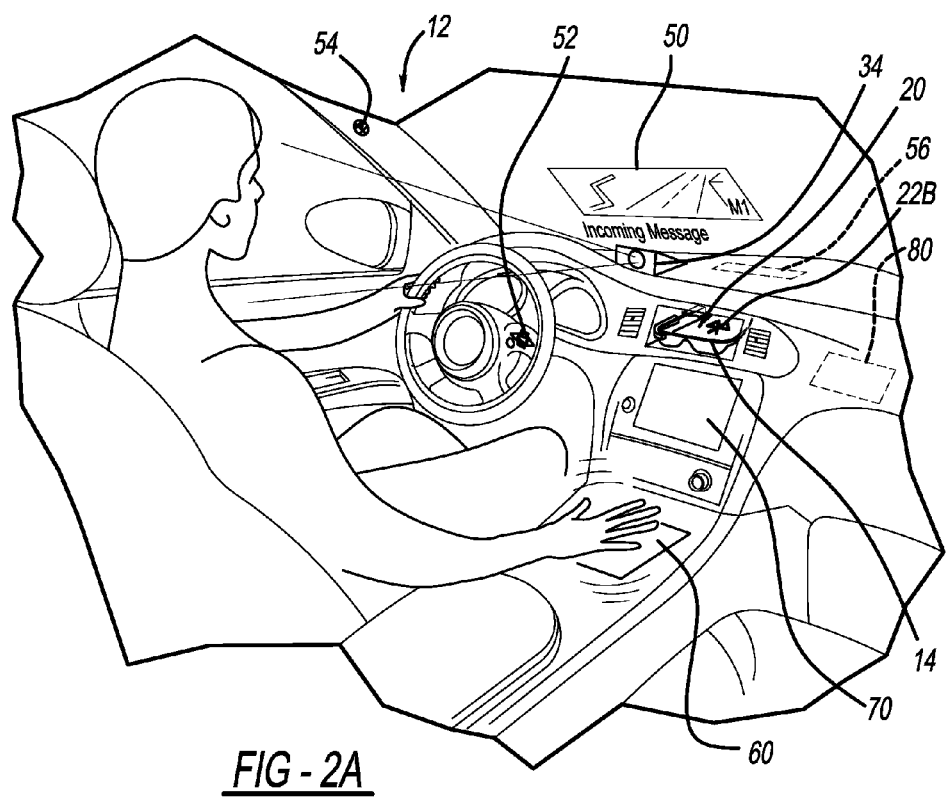
FIG. 2A illustrates a passenger cabin of the vehicle of FIG. 1.
Figure 2B:
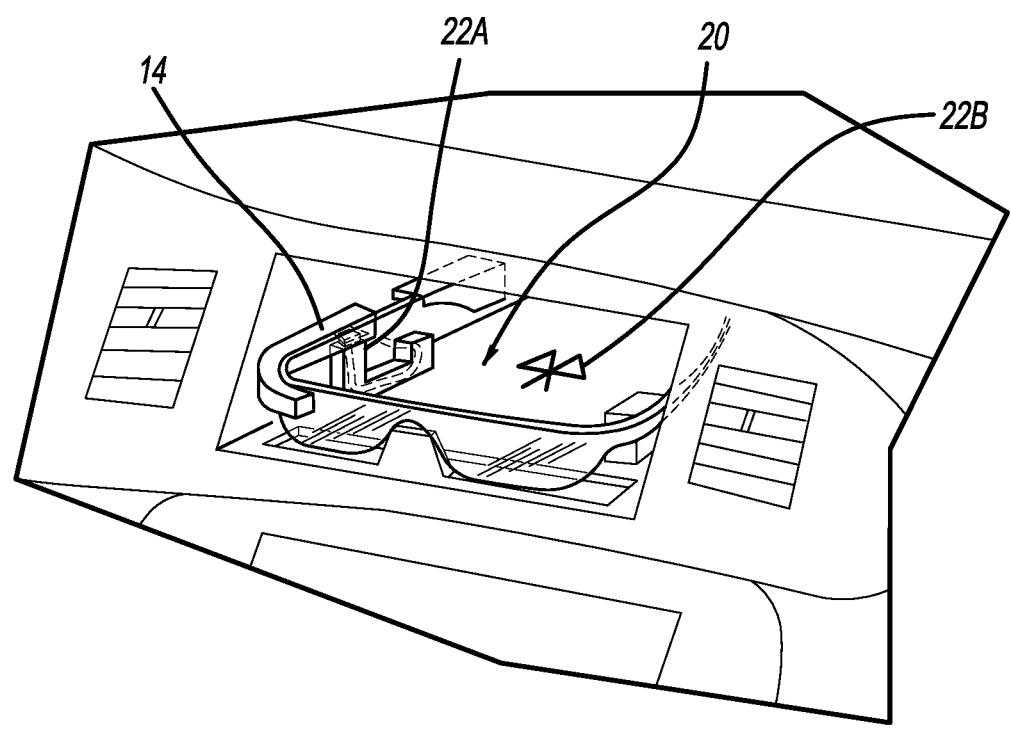
FIG. 2B illustrates a dock of the passenger cabin configured to receive the wearable personal electronic device.

With initial reference to FIGS. 1, 2A, and 2B, a vehicle 10 including a vehicle information system 12 configured to integrate therewith a wearable personal electronic device 14 is illustrated. Although the vehicle 10 is generally illustrated as a car, the vehicle 10 can be any suitable vehicle, such as, but not limited to, the following: a truck; a van, a sports utility vehicle (SUV); a bus; a military vehicle; a train; a watercraft; any commercial vehicle; an aircraft; or any other suitable vehicle. The wearable personal electronic device 14 can be any suitable wearable personal electronic device, such as a pair of glasses, a watch, a smartphone, or any portable computing device, such as a mobile computer or tablet. The glasses can be any type of glasses, such as Google Glass™ by Google, Inc. Although the wearable personal electronic device 14 can be any suitable wearable personal electronic device, the wearable personal electronic device 14 will be referred to herein as a pair of glasses for exemplary purposes.

The system 12 generally includes a dock 20 configured to receive and secure the glasses 14. The dock 20 can be any suitable dock or coupling device configured to securely receive the glasses 14 in order to prevent the glasses 14 from undesirably moving during operation of the vehicle 10. The dock 20 can include any suitable interface for electronically integrating the glasses 14 with the system 12 in order to transmit data to, and receive data from, the system 12. For example and with reference to FIGS. 2A and 2B, the interface can be a wired interface 22A (such as a micro USB port), and/or a wireless interface 22B (such as a Bluetooth connection).

The system 12 further includes a plurality of cameras, such as a front external camera 30 (FIG. 1), a rear external camera 32 (FIG. 1), and/or an internal camera 34 (FIG. 2A). Each one of the cameras 30, 32, and 34 can be configured to receive images and/or any suitable types of data. The cameras 30, 32, and 34 can be configured and positioned to receive and detect any data, such as image or non-image data, which would typically be received and detected by a camera mounted to the glasses 14 themselves. The cameras 30, 32, and/or 34 can be connected to a data capture management (DCM) device or system 36 (FIG. 1), which can be any suitable device or system for capturing and managing data, and can include a memory module for storing data. The DCM device 36 can be configured to provide connectivity to a server 38, which can be onboard the vehicle 10 or be a remote server. Any suitable transmitter/receiver 40 can be used to provide communication with the server 38 when the server 38 is remote. The server 38 can be any suitable server configured to analyze images and user requests, such as images and user requests input to the glasses 14. For example, the server 38 can be remote servers provided by Google, Inc., which are generally accessible through the Internet. Exemplary user requests include navigation requests, Internet search requests, messaging requests, etc.

The system 12 further includes a heads-up-display (HUD) 50. The HUD 50 can be any suitable display and system configured to display information to the driver at or proximate to a windshield of the vehicle 10 in a manner that does not require the driver to look away from his or her usual viewpoints. The HUD can display any suitable types of information, such as navigational instructions, message alerts, incoming messages, warnings, Internet search results, images and data from the cameras 30, 32, and/or 34, and background information regarding places and things within view of the driver, for example. When the glasses 14 are connected to the system 12, such as through the interface 22A/22B, the HUD 50 can be used to display any information typically displayed to the driver by way of the glasses 14 when the driver is wearing the glasses 14. The HUD 50 can generally be driven by the glasses 14. Therefore, the information and data displayed on the HUD can be provided by, or at least routed through, the glasses 14. For example, the navigational information can be generated by the glasses 14 either independently or through a connection to the Internet, such as a connection to the remote server 38, and transmitted to the HUD 50 through the system 12. The vehicle 10 can include multiple HUDs 50, or any other suitable type of display, positioned at any suitable location within the vehicle 10 for viewing by passengers of the vehicle 10.

The system 12 can receive commands and inputs for operating the glasses 14 from the driver in a variety of different ways. For example, the steering wheel includes controls 52, which the driver can actuate manually to input any suitable types of commands, such as volume commands, navigational comments, menu selection commands, messaging commands, etc. The steering wheel controls 52 may provide the same functionality as any buttons or other controls of the glasses 14.

The system 12 can also accept voice commands received through a microphone 54, which can be mounted at any suitable position in the vehicle 10. Any suitable voice recognition and control system can be used. Functionality of the voice recognition and control system can be included with the vehicle information system 12 itself. For example, voice commands can be analyzed and processed with a voice recognition control module 56, which can be any suitable device and/or system for recognizing and processing voice commands Further, voice recognition and control functionality of the glasses 14 themselves may be used in place of, or to compliment, voice recognition and control functionality of the vehicle information system 12. Therefore, the vehicle information system 12 may merely include the microphone 54 and optionally a speaker as part of its voice recognition and control functionality, with voice commands being transmitted to the glasses 14, and/or the server 38 for processing.

The system 12 can further receive input commands for operating the glasses 14 by way of a motion sensor 60. The motion sensor 60 can be positioned at any suitable position within the vehicle 10, such as at a passenger cabin center counsel as illustrated in FIG. 2A. The motion sensor 60 can be configured to detect any suitable commands, such as hand gestures made by the driver or passengers. Any suitable hand gestures can be detected. For example, to navigate menus appearing on the HUD 50 or on a display 70, the driver may wave his or her hand forward to move ahead in the menu listings, and may wave his or hand backward to move backwards in the menu listings. The motion sensor 60 may provide the same functionality as any touch sensor included with the glasses 14, such as the touch sensor included with Google Glass™ glasses offered for sale by Google, Inc.

The system 12 can further include a controller 80. The controller 80 can be any suitable controller configured to control functions of the system 12, including connecting the glasses 14 to the system 12, inputting data and commands to the glasses 14, receiving data from the glasses 14, and communication with the server 38. The controller 80 can be any suitable controller and can include, for example, a processor and memory.

Figure 3:
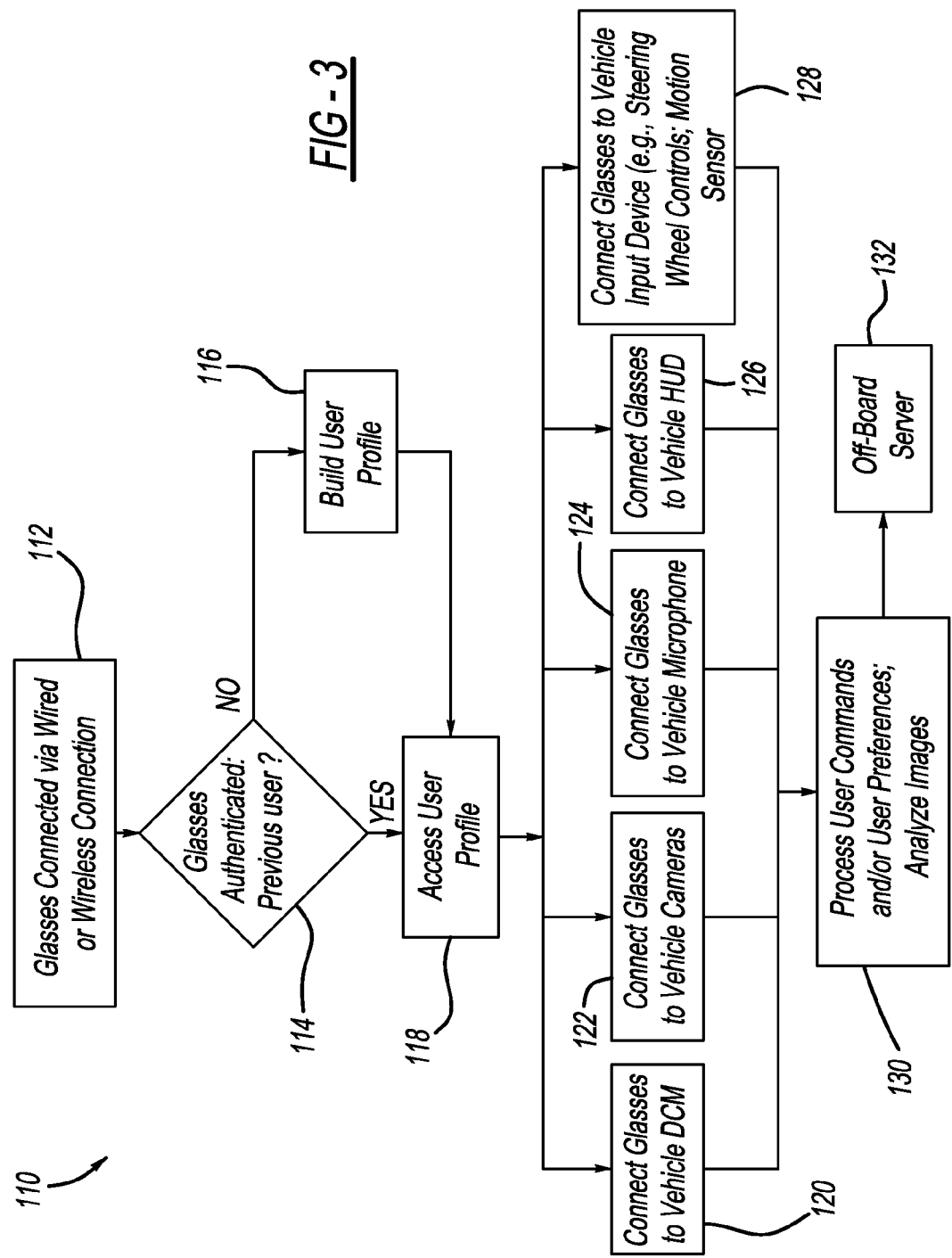
FIG. 3 is a flow-chart illustrating integration of the wearable personal electronic device with the system according to the present teachings.

With continued reference to FIGS. 1, 2A, and 2B, and additional reference to the system and method at reference numeral 110 of FIG. 3, connection of the glasses 14 to the vehicle 10 and authentication of the glasses 14 will now be described. The glasses 14 are initially seated on the dock 20 and connected to the system 12 in any suitable manner at block 112 of FIG. 3. For example, the glasses 14 can be connected using the wired interface 22A or the wireless interface 22B. Any suitable controller or processor onboard or remote to the vehicle 10, such as the controller 80, will then receive user identification information from the glasses 14 and determine whether the user is a new user or a prior user at block 114. If the user is a new user, a user profile and login can be created for the user at block 116. If the user is a returning user, the user's profile and preferences will be accessed by the controller 80 at block 118.

The glasses 14 are next connected to and integrated with the vehicle information system 12 in any suitable manner. For example, connectivity of the glasses 14 is paired to the vehicle DCM at block 120, feeds from the camera or cameras 30, 32, and/or 34 are input to the glasses 14 at block 122, the microphone 54 is connected to the glasses 14 at block 124 so that voice commands, or any other suitable audio data, can be input to the glasses 14 for processing, data output from the glasses 14 is redirected to the heads-up display 50 or any other suitable display or device of the vehicle information system 12 at block 126, and at block 128 the glasses 14 are connected to any suitable vehicle input device, such as the steering wheel controls 52 and/or the motion sensor 60.

After the glasses 14 have been connected to the vehicle information system 12, the glasses 14 can use the inputs thereto in any suitable manner. For example, the glasses 14 can be configured to analyze images from the camera or cameras 30, 32, and/or 34 and await instructions in the form of user input commands or user profile preferences at block 130. At block 132 the glasses 14 can be configured to communicate with any suitable on-board or off-board analytic device, such as the server 38, in order to analyze inputs to the glasses 14, such as command inputs, image inputs, or any other suitable data inputs.

Figure 4:
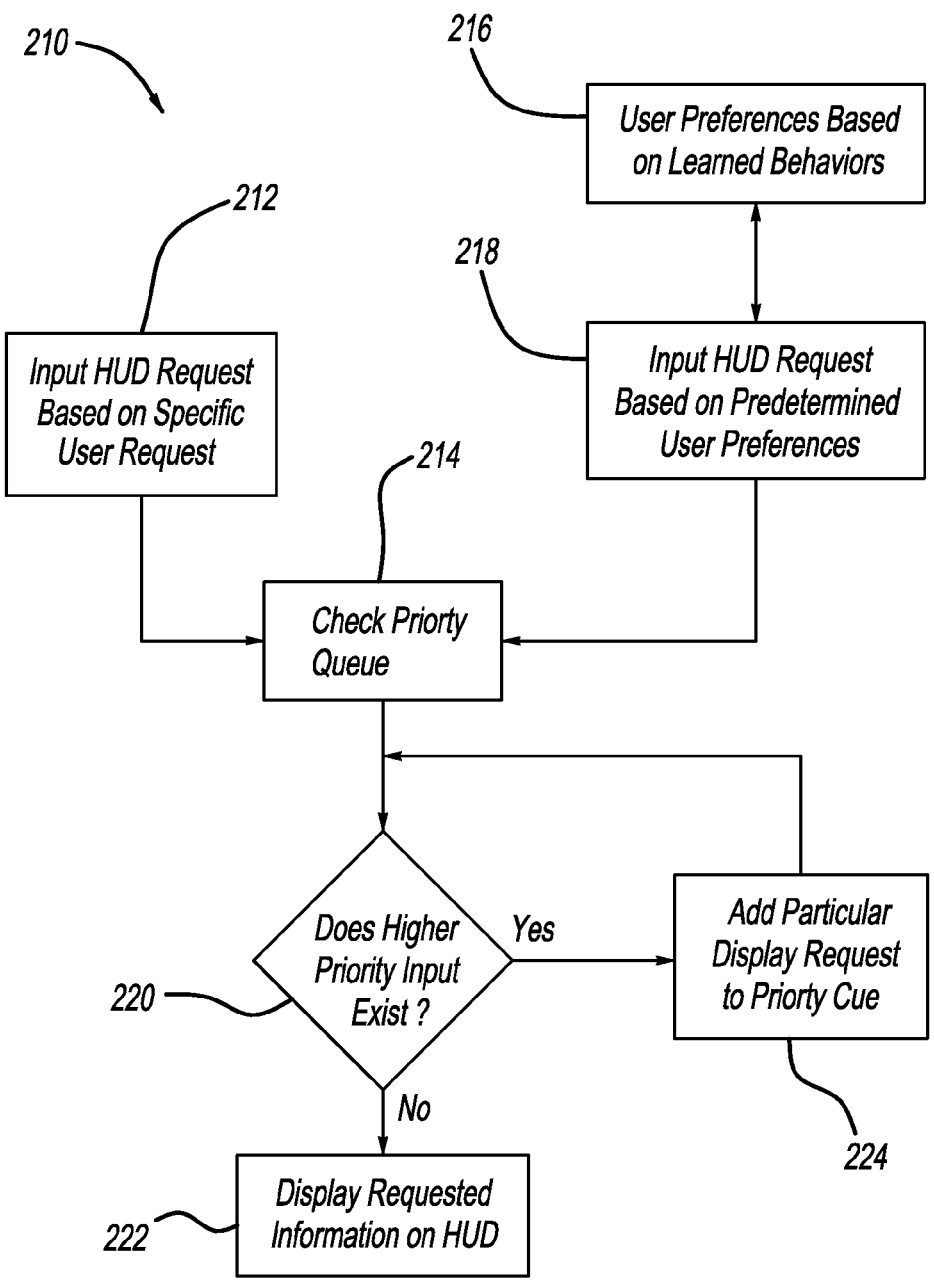
FIG. 4 is a flow-chart illustrating management of requests input to the wearable personal electronic device.

With additional reference to FIG. 4, further operation of the glasses 14 and vehicle information system 12 will now be described. As illustrated in FIG. 4, the present teachings provide a method and system 210 for prioritizing information requested to be displayed on the HUD 50. For example, at block 212 a user may input a request to the glasses 14 for displaying particular information on the HUD 50 in any suitable manner, such as with a voice request. At block 214, any suitable controller or processor of the vehicle information system 12, such as the controller 80, will analyze the request and determine where the request lies in a priority queue. If at block 220 it is determined by the controller 80, for example, that higher priority requests exist in the queue, the controller 80 will add the user's request to the priority queue at block 224. If no higher priority request exists in the queue, the requested information will be displayed in the vehicle heads-up display 50 at block 222. Any suitable request can be made, and the priority thereof can be determined in any suitable manner. For example, the priority of the request can be based on whether fulfilling the request will distract the driver at the particular time, or based on user preferences, which can be learned by the vehicle information system 12. Paired behavior of the glasses 14 can be stored in the vehicle information system 12 in any suitable manner using any suitable device, such as a suitable memory device.

The present teachings thus provide methods, systems, and devices configured to integrate and dock a suitable personal electronic device, such as wearable glasses (e.g., Google Glass™), as part of a vehicle system, such as the vehicle information system 12. The vehicle system 12 provides interfaces and re-routing of inputs and outputs to the glasses 14 in order to make use and interaction with the glasses 14 easier, safer, and less distracting.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The description of the embodiments is provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for integrating a wearable personal electronic device with a vehicle, the system comprising:
    an interface configured to connect the wearable personal electronic device to the system, the interface includes a dock having a connector configured to connect the wearable personal electronic device to the system and charge the wearable personal electronic device;
    a vehicle camera configured to provide video input to the wearable personal electronic device through the interface; and
    a vehicle heads-up display configured to display data received from the wearable personal electronic device;
    a motion sensor mounted within the passenger cabin of the vehicle, the motion sensor configured to detect physical commands for operating the glasses;
    wherein the wearable personal electronic device is a pair of glasses the pair of glasses are connected to the connector of the dock and not worn by an operator of the vehicle while the operator is operating the vehicle in order to connect the pair of glasses to the system and charge the pair of glasses.

2. The system of claim 1, wherein the camera is configured to capture at least one of image data or non-image data external to the vehicle.

3. The system of claim 1, further comprising a vehicle controller configured to process and prioritize data and commands both to and from the wearable personal electronic device.

4. The system of claim 1, further comprising a transmitter and receiver onboard the vehicle configured to transmit data from the personal electronic device to a remote server, and receive data from the remote server for input to the personal electronic device.

5. The system of claim 1, further comprising a voice recognition control module and a motion sensor configured to receive operating commands for the personal electronic device.

6. A method for integrating a wearable personal electronic device with a vehicle system comprising:
   connecting the wearable personal electronic device to the vehicle system through an interface dock of the vehicle system;
   inputting data to the personal electronic device from a camera of the vehicle system configured to capture at least one of image data or non-image data; and
   displaying data from the personal electronic device on a heads-up display of the vehicle system;
   transmitting to the personal electronic device voice commands received by a voice recognition device mounted within the vehicle;
   wherein the wearable personal electronic device is a pair of glasses, the pair of glasses are connected to the connector of the dock and not worn by an operator of the vehicle while the operator is operating the vehicle in order to connect the pair of glasses to the system and charge the pair of glasses.

7. The method of claim 6, wherein the camera is configured to capture at least one of image data or non-image data external to the vehicle.

8. The method of claim 6, wherein the camera is configured to capture at least one of image data or non-image data internal to the vehicle.

9. The method of claim 6, wherein the interface includes a wired coupling member.

10. The method of claim 6, further comprising connecting the wearable personal electronic device to a vehicle data capture and management device onboard the vehicle configured to provide connectivity to a remote server for analyzing user requests and images received by the camera.

11. The method of claim 6, further comprising connecting the wearable personal electronic device to a server remote to the vehicle.

12. A system for integrating electronic glasses with a vehicle, the system comprising: a dock within a passenger cabin of the vehicle including an electronic interface configured to charge the glasses and electronically connect the glasses to the system;
   a first vehicle camera mounted to the vehicle and configured to capture at least one of image data or non-image data external to the vehicle, the first vehicle camera in communication with the glasses to provide video input to the glasses;
   a vehicle heads-up display configured to receive data inputs from the glasses; and
   a controller configured to prioritize input commands to the glasses based in part on user preferences and learned behavior;
   a motion sensor mounted within the passenger cabin of the vehicle, the motion sensor configured to detect physical commands for operating the glasses;
   wherein the glasses are connected to the connector of the dock and not worn by an operator of the vehicle while the operator is operating the vehicle in order to connect the glasses to the system and charge the glasses.

13. The system of claim 12, further comprising a second vehicle camera mounted to the vehicle and configured to capture at least one of image data or non-image data inside the vehicle, and in communication with the glasses to provide video input to the glasses.

14. The system of claim 12, further comprising a voice recognition control module of the vehicle configured to receive operating commands for the glasses.

* * * * *